United States Patent
Huang et al.

(10) Patent No.: US 8,000,592 B2
(45) Date of Patent: Aug. 16, 2011

(54) DRIVING CIRCUIT FOR A PHOTOGRAPHING MODULE

(75) Inventors: Chen Yi Huang, Taichung (TW); Te Sheng Tseng, Taichung (TW); Chao Yang Chen, Taichung (TW); Wen Hung Hsu, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/762,073

(22) Filed: Apr. 16, 2010

(65) Prior Publication Data

US 2011/0052170 A1    Mar. 3, 2011

Related U.S. Application Data

(60) Provisional application No. 61/237,168, filed on Aug. 26, 2009.

(51) Int. Cl.
*G03B 3/10* (2006.01)
*G03B 13/00* (2006.01)
(52) U.S. Cl. ...................... 396/133; 348/357
(58) Field of Classification Search .................. 396/133; 348/357
See application file for complete search history.

(56) References Cited

U.S. PATENT DOCUMENTS

| | | | |
|---|---|---|---|
| 7,440,688 B2 * | 10/2008 | Uehara et al. ................... 396/55 |
| 7,720,366 B2 * | 5/2010 | Iwasaki et al. .................. 396/55 |
| 7,848,627 B2 * | 12/2010 | Uenaka .......................... 396/53 |
| 2006/0033818 A1 | 2/2006 | Wada et al. |
| 2006/0127074 A1 * | 6/2006 | Noji ............................... 396/55 |
| 2006/0133786 A1 * | 6/2006 | Teramoto ....................... 396/55 |
| 2007/0091181 A1 * | 4/2007 | Serikawa et al. .......... 348/208.3 |
| 2008/0068489 A1 | 3/2008 | Watanabe et al. |
| 2008/0226277 A1 * | 9/2008 | Uenaka et al. .................. 396/55 |
| 2008/0259171 A1 * | 10/2008 | Chiang et al. .............. 348/208.7 |
| 2008/0298790 A1 * | 12/2008 | Uenaka et al. .................. 396/55 |
| 2009/0052037 A1 | 2/2009 | Wernersson |
| 2009/0085558 A1 | 4/2009 | David et al. |
| 2010/0080545 A1 * | 4/2010 | Fan et al. ........................ 396/55 |

FOREIGN PATENT DOCUMENTS

| | | |
|---|---|---|
| JP | 10133246 A | 5/1998 |
| WO | 2008029671 A1 | 3/2008 |

* cited by examiner

*Primary Examiner* — Rodney Fuller
(74) *Attorney, Agent, or Firm* — Tim Tingkang Xia; Morris, Manning & Martin, LLP (57) ABSTRACT

A driving circuit for a photographing module includes a load comprising three coils and four signal input ends; a power source configured to drive the coils and capable of providing an intermediate level between a supply voltage level and a ground level; and a set of electronic switch elements. The driving circuit controls the magnitudes and directions of the electric currents flowing through the coils by switching the set of electronic switch elements, thereby enabling the photographing module to perform auto-focusing and compensate for an angle of inclination.

7 Claims, 13 Drawing Sheets

| I1 | I2 | I3 | S1 | S2 | S3 | S4 | S5 | S6 | S7 | S8 | Action |
|---|---|---|---|---|---|---|---|---|---|---|---|
| + | + | + | Turn on | Turn off | Turn on | Turn off | Turn on | Turn off | Turn off | Turn on | Auto-focusing and compensation of an angle of inclination |
| + | + | − | Turn on | Turn off | Turn on | Turn off | Turn off | Turn off | Turn off | Turn off | Compensation of an angle of inclination |
| + | − | − | Turn on | Turn off | Turn off | Turn on | Turn off | Turn on | Turn on | Turn off | Compensation of an angle of inclination |
| + | − | + | Turn on | Turn off | Turn off | Turn on | Turn on | Turn on | Turn on | Turn off | Compensation of an angle of inclination |
| − | + | + | Turn off | Turn on | Turn on | Turn off | Turn on | Turn off | Turn on | Turn off | Compensation of an angle of inclination |
| − | + | − | Turn off | Turn on | Turn on | Turn off | Turn off | Turn off | Turn on | Turn off | Compensation of an angle of inclination |
| − | − | + | Turn off | Turn on | Turn off | Turn on | Turn off | Turn on | Turn on | Turn off | Compensation of an angle of inclination |
| − | − | − | Turn off | Turn on | Turn off | Turn on | Turn off | Turn off | Turn on | Turn off | Auto-focusing and compensation of an angle of inclination |

| I1 | I2 | I3 | I4 | S1 | S2 | S3 | S4 | S5 | S6 | S7 | S8 | S9 | S10 | Action |
|---|---|---|---|---|---|---|---|---|---|---|---|---|---|---|
| + | + | + | + | Turn on | Turn off | Turn on | Turn off | Turn on | Turn off | Turn on | Turn off | Turn off | Turn on | Auto-focusing and compensation of an angle of inclination |
| + | + | + | - | Turn on | Turn off | Turn on | Turn off | Turn on | Turn off | Turn off | Turn off | Turn off | Turn off | Compensation of an angle of inclination |
| + | + | - | - | Turn on | Turn off | Turn on | Turn off | Turn off | Turn on | Turn off | Turn on | Turn on | Turn off | Compensation of an angle of inclination |
| + | + | - | + | Turn on | Turn off | Turn on | Turn off | Turn off | Turn on | Turn on | Turn on | Turn on | Turn off | Compensation of an angle of inclination |
| + | - | - | - | Turn on | Turn off | Turn off | Turn on | Turn off | Turn on | Turn on | Turn off | Turn on | Turn off | Compensation of an angle of inclination |
| + | - | - | + | Turn on | Turn off | Turn off | Turn on | Turn off | Turn on | Turn on | Turn on | Turn on | Turn off | Compensation of an angle of inclination |
| + | - | + | - | Turn on | Turn off | Turn off | Turn on | Turn on | Turn off | Turn off | Turn on | Turn on | Turn off | Compensation of an angle of inclination |
| + | - | + | + | Turn on | Turn off | Turn off | Turn on | Turn on | Turn off | Turn on | Turn off | Turn on | Turn off | Compensation of an angle of inclination |
| - | + | + | - | Turn off | Turn on | Turn on | Turn off | Turn on | Turn off | Turn on | Turn off | Turn on | Turn off | Compensation of an angle of inclination |
| - | + | + | + | Turn off | Turn on | Turn on | Turn off | Turn on | Turn off | Turn on | Turn on | Turn on | Turn off | Compensation of an angle of inclination |
| - | + | - | + | Turn off | Turn on | Turn off | Turn on | Turn on | Turn off | Turn off | Turn on | Turn on | Turn off | Compensation of an angle of inclination |
| - | + | - | - | Turn off | Turn on | Turn off | Turn on | Turn off | Turn on | Turn off | Turn on | Turn on | Turn off | Compensation of an angle of inclination |
| - | - | + | + | Turn off | Turn on | Turn off | Turn on | Turn off | Turn on | Turn off | Turn on | Turn on | Turn off | Compensation of an angle of inclination |
| - | - | + | - | Turn off | Turn on | Turn off | Turn on | Turn off | Turn on | Turn on | Turn off | Turn on | Turn off | Compensation of an angle of inclination |
| - | - | - | + | Turn off | Turn on | Turn off | Turn on | Turn off | Turn on | Turn off | Turn on | Turn on | Turn off | Compensation of an angle of inclination |
| - | - | - | - | Turn off | Turn on | Turn off | Turn on | Turn off | Turn on | Turn off | Turn on | Turn off | Turn on | Auto-focusing and compensation of an angle of inclination |

DRIVING CIRCUIT FOR A PHOTOGRAPHING MODULE

This Non-provisional application claims priority under 35 U.S.C. §119(e) on U.S. Provisional Application No. 61/237,168 filed on Aug. 26, 2009, all of which is hereby expressly incorporated by reference into the present application.

BACKGROUND OF THE INVENTION

1. Field of the Invention

The present invention relates to a driving circuit for a photographing module, and more particularly, to a driving circuit for driving a photographing module to perform auto-focusing and compensate for an angle of inclination.

2. Description of the Prior Art

Figure 12:
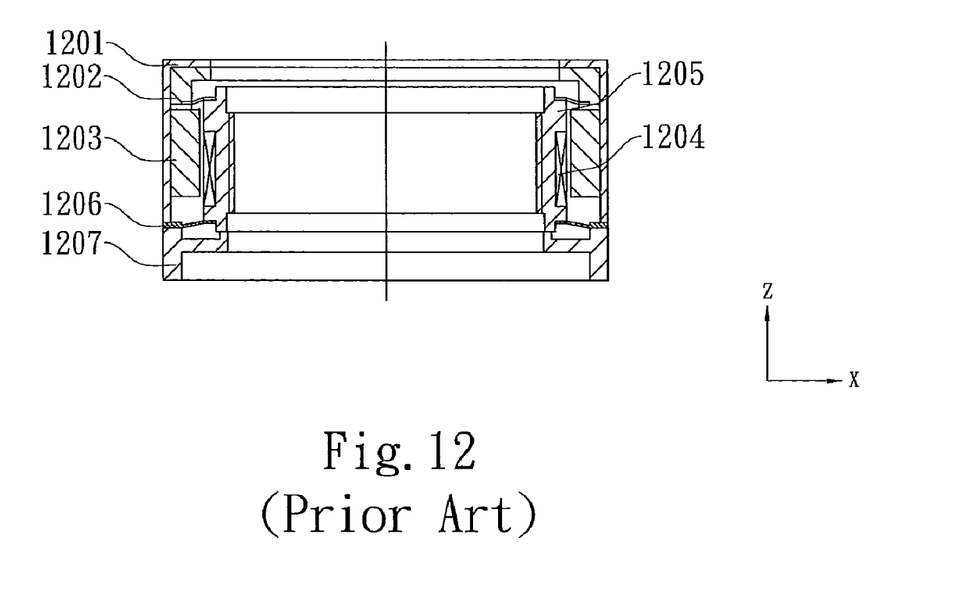
FIG. 12 shows a schematic cross-sectional view of a prior art actuator for a photographing module.

FIG. 12 shows a schematic cross-sectional view of a prior art actuator for a photographing module. The prior art actuator includes a yoke 1201, a pad 1202, a magnet 1203, a coil 1204, a movable member 1205, an elastic member 1206 and a holder 1207. The coil 1204 is electrically driven so that it will interact with the magnetic field of the magnet 1203 to generate a force that drives the movable member 1205 to move with respect to an axis (Z-axis) when a current is directed therethrough.

Though the aforementioned prior art actuator can cause a movement with respect to an axis, it is not capable of providing an angle of inclination with respect to any axis. Accordingly, the compensation for an angle of inclination cannot be performed to correct the blurred image caused due to the shake of the photographing module. Therefore, a need exists in the art for an improved structure that can resolve the aforementioned drawback.

SUMMARY OF THE INVENTION

One object of the present invention is to provide a driving circuit for a photographing module. The driving circuit can drive a lens assembly in the photographing module to simultaneously move with respect to an axis to perform auto-focusing and incline at an angle with respect to at least one axis to compensate for an angle of inclination. Consequently, the blurred image caused due to the shake of the photographing module can be corrected.

In order to achieve the aforementioned object, the present invention provides a driving circuit for a photographing module comprising: a load comprising three coils and four signal input ends; a power source configured to drive the three coils and capable of providing an intermediate level between the supply voltage level and the ground level; and a set of electronic switch elements; wherein the driving circuit controls the magnitudes and directions of the electric currents flowing through the three coils by switching the set of electronic switch elements, thereby the photographing module can perform auto-focusing and compensate for an angle of inclination.

In the aforementioned driving circuit, it is preferable that the power source provides the intermediate level by means of two capacitors.

In the aforementioned driving circuit, it is preferable that the driving circuit controls the effective current flowing through each coil by means of pulse width modulation.

In the aforementioned driving circuit, it is preferable that the number of the set of electronic switch elements is eight.

The present invention provides another driving circuit for a photographing module comprising: a load comprising four coils and five signal input ends; a power source configured to drive the four coils and capable of providing an intermediate level between the supply voltage level and the ground level; and a set of electronic switch elements; wherein the driving circuit controls the magnitudes and directions of the electric currents flowing through the four coils by switching the set of electronic switch elements, thereby the photographing module can perform auto-focusing and compensate for an angle of inclination.

In the aforementioned driving circuit, it is preferable that the power source provides the intermediate level by means of two capacitors.

In the aforementioned driving circuit, it is preferable that the driving circuit controls the effective current flowing through each coil by means of pulse width modulation.

In the aforementioned driving circuit, it is preferable that the number of the set of electronic switch elements is ten.

BRIEF DESCRIPTION OF THE DRAWINGS

FIG. 11 is a table showing the status of the electronic switch elements of the driving circuit in accordance with the second embodiment of the present invention.

DETAILED DESCRIPTION OF THE PREFERRED EMBODIMENTS

The preferred embodiments of a photographing module and the driving circuit thereof of the present invention will be described in detail with reference to the accompanying drawings.

Figure 1A:
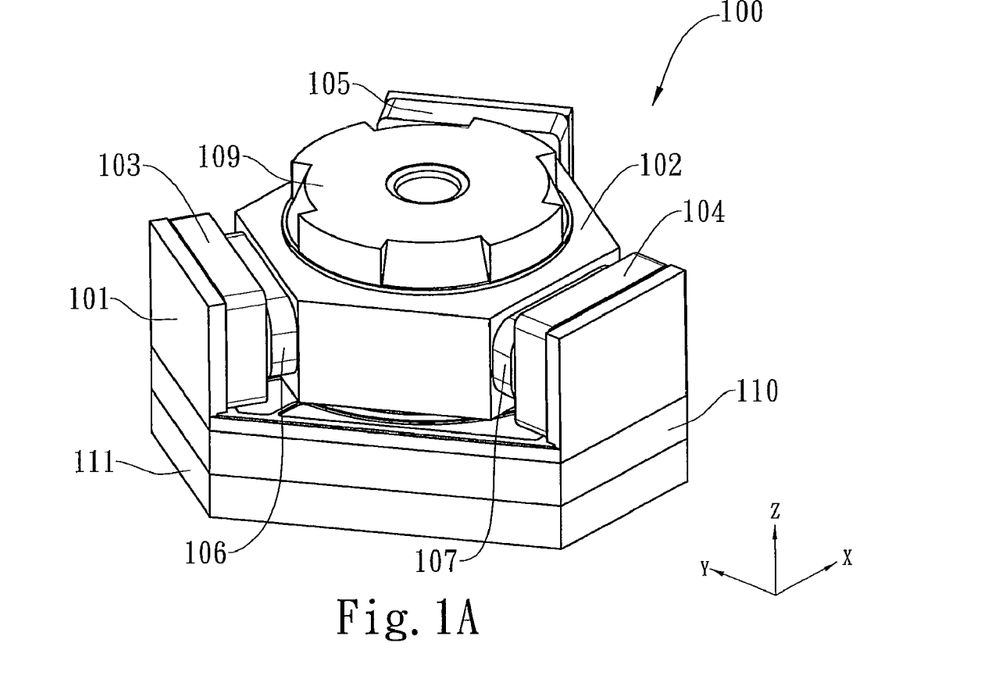
FIG. 1A shows a schematic perspective view of a photographing module which adopts a first embodiment of the present driving circuit.
Figure 1B:
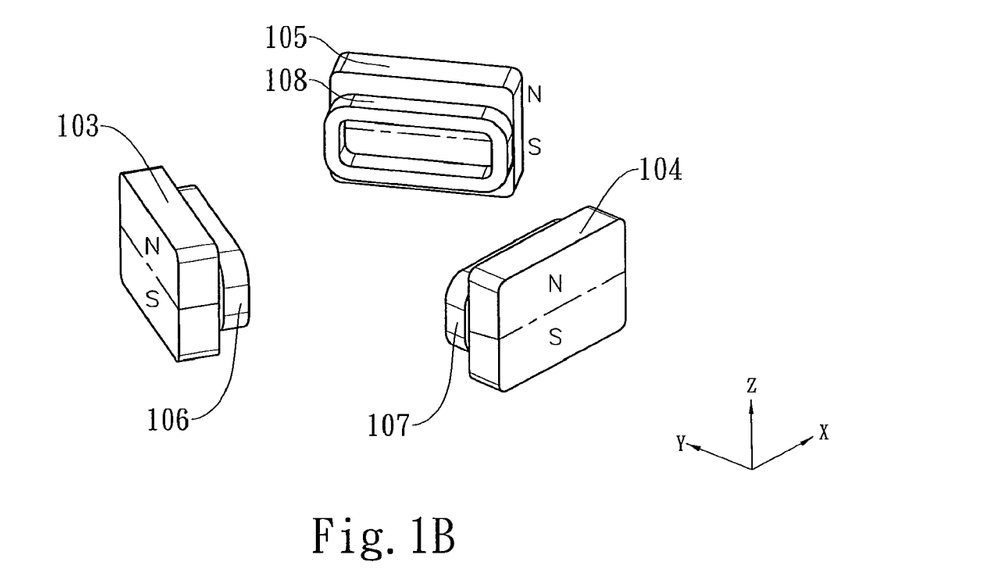
FIG. 1B shows a schematic perspective view of the magnetic circuit system shown in FIG. 1A.

FIG. 1A shows a schematic perspective view of a photographing module 100 which adopts a first embodiment of the present driving circuit. The photographing module 100 includes a holder 101, a movable member 102, a lens assembly 109, and a magnetic circuit system comprising three magnets 103, 104 and 105 and three coils 106, 107 and 108, as shown in FIG. 1B. The magnetic circuit system is evenly and symmetrically disposed around the movable member 102.

FIG. 1B shows a schematic perspective view of the magnetic circuit system shown in FIG. 1A. The magnetic circuit system enables the movable member 102 to move with respect to an axis and incline at an angle with respect to at least one axis. The aforementioned three magnets 103, 104 and 105 and three coils 106, 107 and 108 form three magnet-coil sets whereby the magnetic circuit system is evenly and symmetrically disposed around the movable member 102. In each magnet-coil set, the polar directions of the top and bottom parts of the magnet are opposite and perpendicular to the axis with respect to which the movable member 102 moves, and the central axis of the coil is perpendicular to the axis with respect to which the movable member 102 moves. For example, the polar directions of the top and bottom parts of the magnet 104 are in the Y and −Y directions, respectively, and the central axis of the coil 107 is Y-axis. When the coil 107 has an electric current, for example but not limited to, flowing through the upper portion of the coil 107 in the X direction and the lower portion of the coil 107 in the −X direction, both the upper and lower portions of the coil 107 are acted upon by a force (Lorentz Force) in the Z direction, that is, the coil 107 moves in the Z direction. As the coil 107 is associated with the movable member 102, the force further drives the movable member 102.

In the aforementioned magnetic circuit system, a power source is used to drive the three coils such that each coil and a corresponding one of the three magnets generate a force to drive the movable member 102, enabling the photographing module 100 (or the lens assembly 109) to perform auto-focusing and compensate for an angle of inclination. When the currents are simultaneously directed to the three coils from the power source with the same values respectively, the movable member 102 can move with respect to an axis, enabling the photographing module 100 to perform auto-focusing. When only one of the three coils is driven by the current delivered from the power source, the movable member 102 can incline at an angle with respect to an axis, enabling the photographing module 100 to compensate for an angle of inclination. When two of the three coils are driven by the currents delivered from the power source, the movable member 102 can incline at an angle with respect to more than one axis, enabling the photographing module 100 to compensate for an angle of inclination. When the currents are simultaneously directed to the three coils from the power source with different values respectively, the movable member 102 can move with respect to an axis and incline at an angle with respect to more than one axis, enabling the photographing module 100 to perform auto-focusing and compensate for an angle of inclination. The movable member 102 may move with respect to an axis and incline at an angle with respect to at least one axis simultaneously depending on the magnitudes and directions of the electric currents and the selection of coils to which the electric currents are to be directed.

Figure 2:
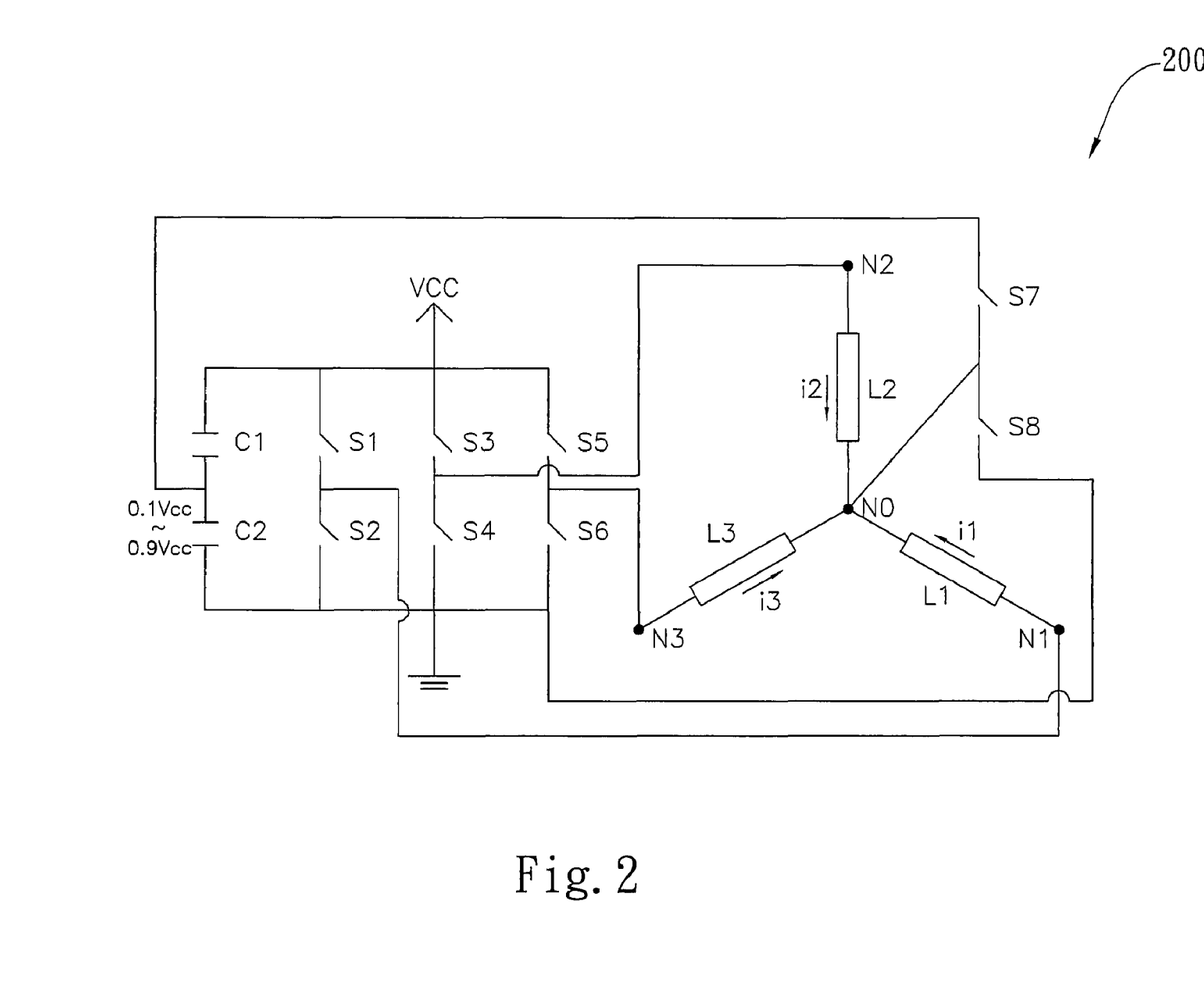
FIG. 2 shows a schematic representation of a driving circuit in accordance with the first embodiment of the present invention.
Figure 3:
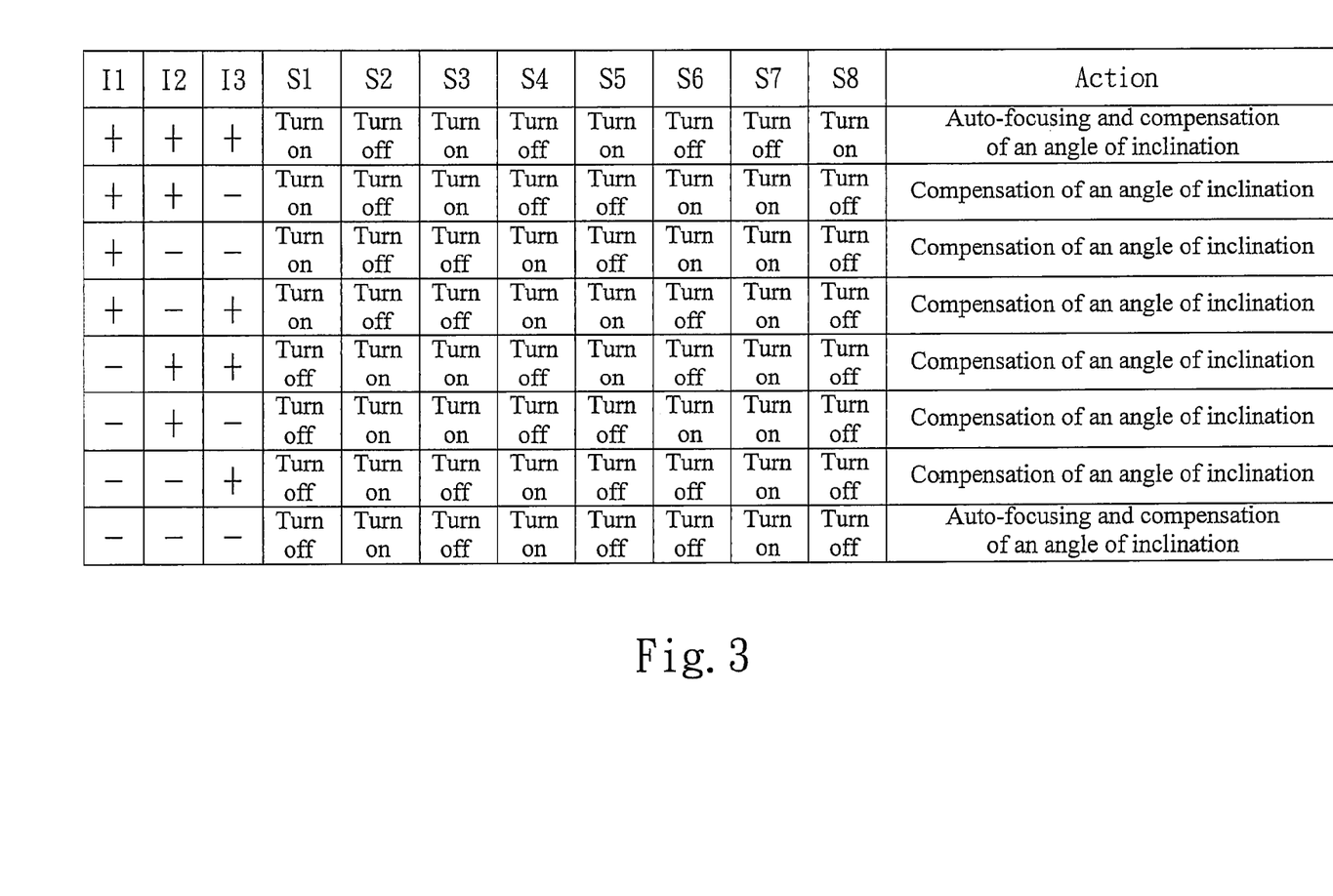
FIG. 3 is a table showing the status of the electronic switch elements of the driving circuit in accordance with the first embodiment of the present invention.

FIG. 2 shows a schematic representation of a driving circuit in accordance with the first embodiment of the present invention. In this embodiment, the driving circuit 200 comprises: a load comprising three coils L1, L2 and L3 and four signal input ends N0, N1, N2 and N3; a power source VCC configured to drive the coils L1, L2 and L3 and capable of providing an intermediate level (such as 0.9 VCC) between the supply voltage level and the ground level by means of two capacitors C1 and C2; and eight electronic switch elements S1-S8; wherein each of L1, L2 and L3 has a front end and a back end, and the back ends of L1, L2 and L3 are all connected to N0 while the front ends of L1, L2 and L3 are connected to N1, N2 and N3, respectively. In this embodiment, the electric current flowing through L1 from N1 to N0 is defined as i1; the electric current flowing through L2 from N2 to N0 is defined as i2; the electric current flowing through L3 from N3 to N0 is defined as i3. One end of S1, S3 and S5 and one end of C1 are connected to the power source VCC; the other end of S1 is connected to one end of S2 and N1; the other end of S3 is connected to one end of S4 and N2; the other end of S5 is connected to one end of S6 and N3. The other end of each of S2, S4 and S6 and one end of C2 are connected to a grounding end and one end of S8; the other end of S8 is connected to N0 and one end of S7; the other end of S7 is connected to the other end of C1 and the other end of C2. The power source VCC is transmitted by switching the aforementioned eight electronic switch elements S1-S8 so as to control the magnitudes and directions of the electric currents flowing through L1, L2 and L3, as shown in FIG. 3. FIG. 3 is a table showing the status of the eight electronic switch elements of the driving circuit in accordance with the first embodiment of the present invention. In the first embodiment, pulse width modulation (see FIGS. 4 and 8) is further employed to control the effective current flowing through each of L1, L2 and L3, thereby the photographing module 100 can perform auto-focusing and compensate for an angle of inclination.

Figure 4:
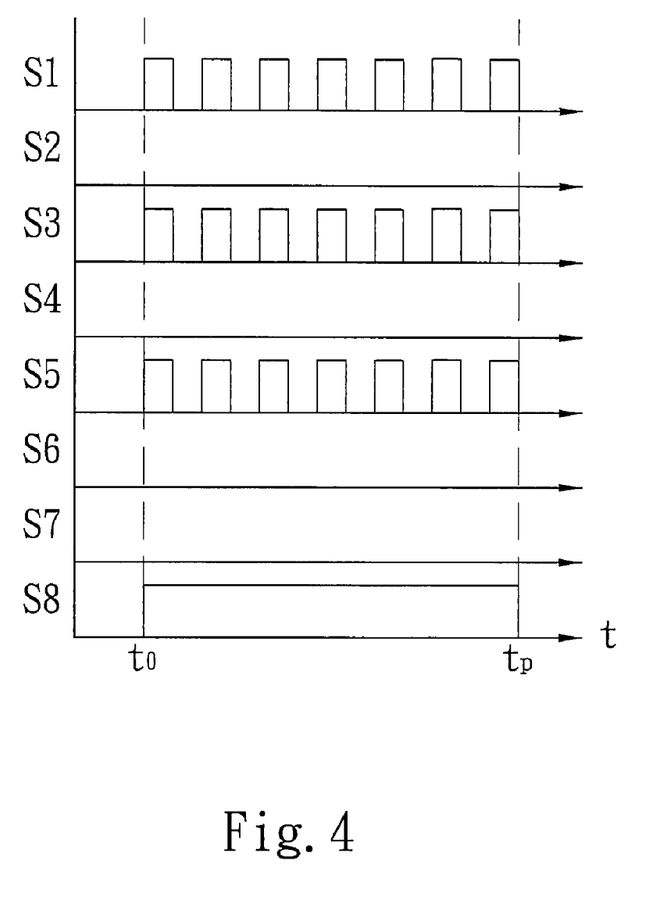
FIG. 4 is a diagram illustrating the timing sequence of pulses sent to the electronic switch elements shown in FIG. 2.
Figure 5:
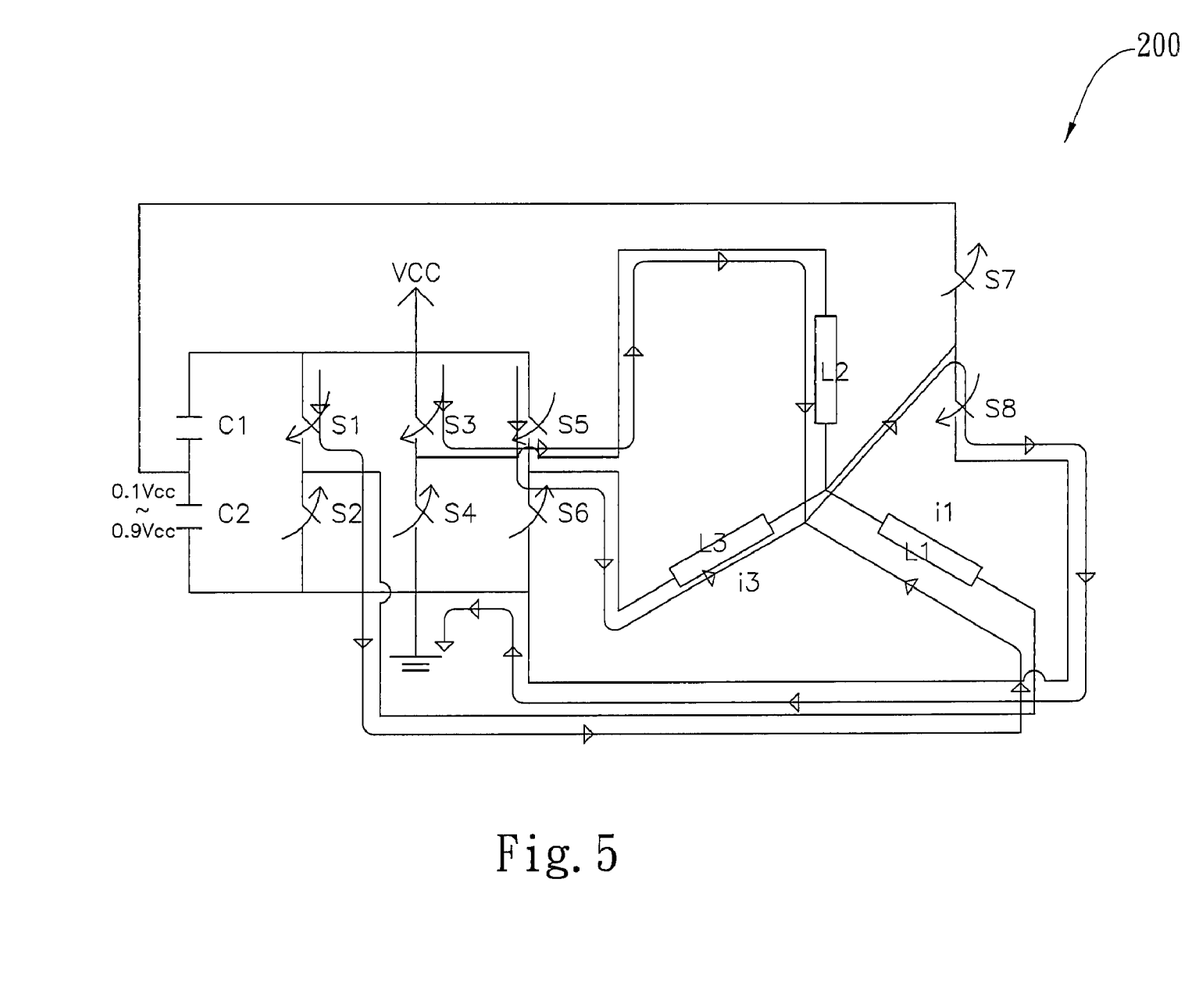
FIG. 5 is a schematic representation showing S1, S3, S5 and S8, among the electronic switch elements shown in FIG. 2, being turned on while S2, S4, S6 and S7 being turned off.

FIG. 5 is a schematic representation showing S1, S3, S5 and S8, among the electronic switch elements shown in FIG. 2, being turned on while S2, S4, S6 and S7 being turned off. Referring to FIG. 3, when S1, S3, S5 and S8 are turned on and S2, S4, S6 and S7 are turned off, i1, i2 and i3 will be "+". If i1, i2 and i3 are "+" and the current values thereof are the same, the movable member 102 can move with respect to an axis, enabling the photographing module 100 to perform auto-focusing, as shown in FIG. 4. If i1, i2 and i3 are "+" and the current values thereof are different, the movable member 102 can move axially and incline at an angle with respect to at least one axis, enabling the photographing module 100 to perform auto-focusing and compensate for an angle of inclination.

Figure 6:
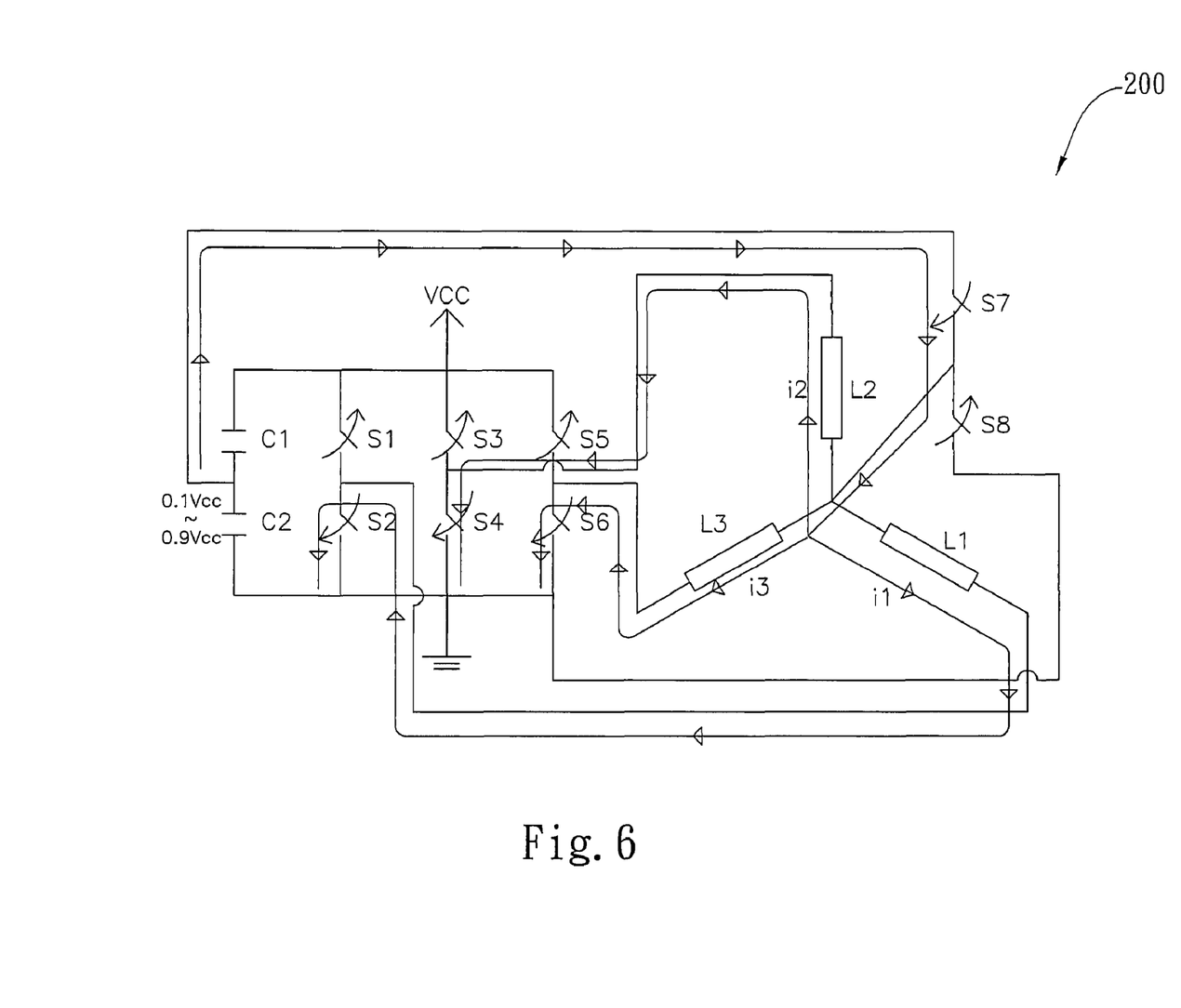
FIG. 6 is a schematic representation showing S2, S4, S6 and S7, among the electronic switch elements shown in FIG. 2, being turned on while S1, S3, S5 and S8 being turned off.

FIG. 6 is a schematic representation showing S2, S4, S6 and S7, among the electronic switch elements shown in FIG. 2, being turned on while S1, S3, S5 and S8 are turned off. Referring to FIG. 3, when S2, S4, S6 and S7 are turned on and S1, S3, S5 and S8 are turned off, i1, i2 and i3 will be "−". If i1, i2 and i3 are "−" and the current values thereof are the same, the movable member 102 can move axially in a direction opposite to the direction in which the movable member 102 moves when i1, i2 and i3 are "+" as shown in FIG. 5, enabling the photographing module 100 to perform auto-focusing. If i1, i2 and i3 are "−" and the current values thereof are different, the movable member 102 can move axially in an opposite direction to the moving direction when i1, i2 and i3 are "+" as shown in FIG. 5 and incline at an angle with respect to at least one axis, enabling the photographing module 100 to perform auto-focusing and compensate for an angle of inclination.

Figure 7:
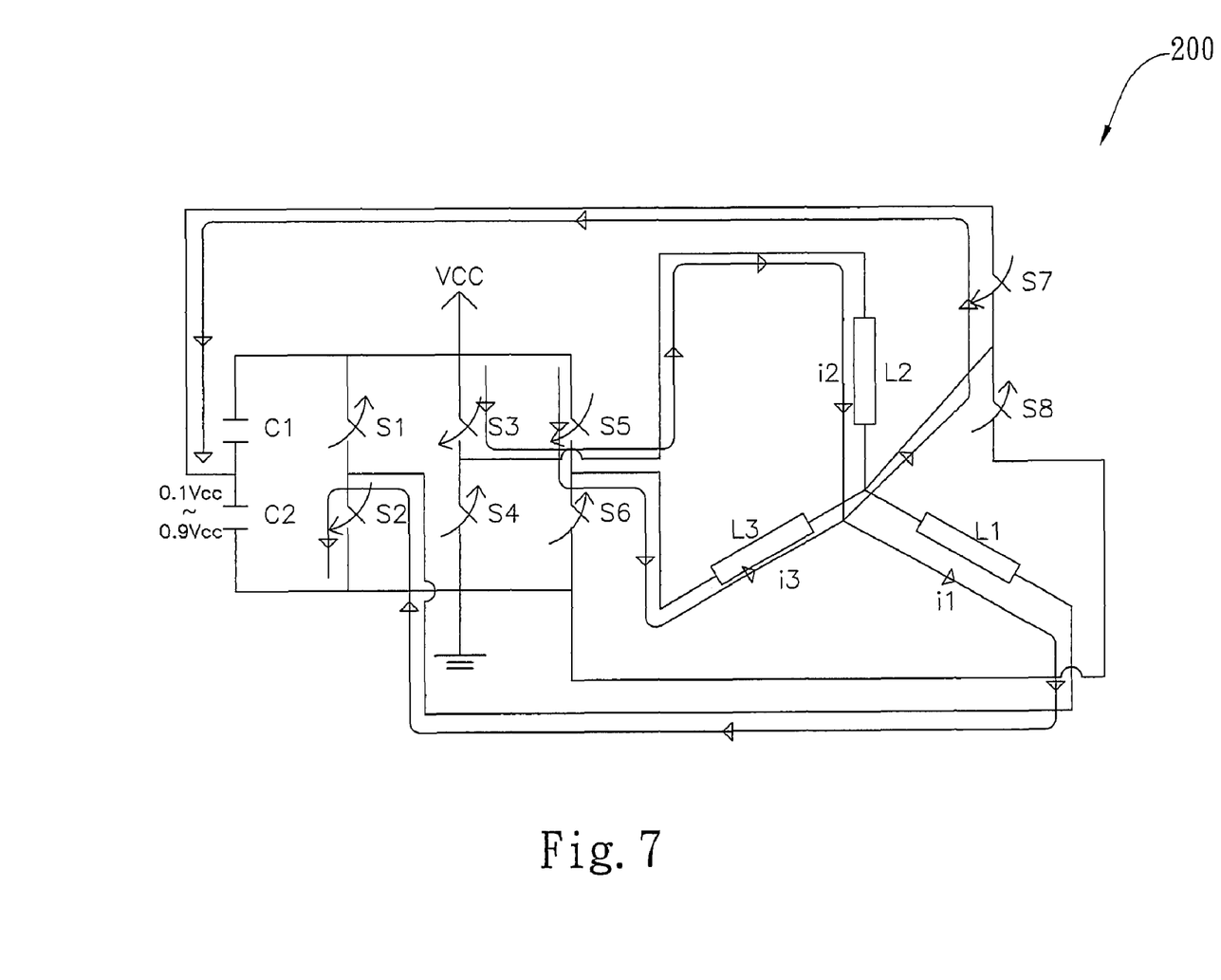
FIG. 7 is a schematic representation showing S2, S3, S5 and S7, among the electronic switch elements shown in FIG. 2, being turned on while S1, S4, S6 and S8 being turned off.

FIG. 7 is a schematic representation showing S2, S3, S5 and S7, among the electronic switch elements shown in FIG. 2, being turned on while S1, S4, S6 and S8 are turned off. Referring to FIG. 3, when S2, S3, S5 and S7 are turned on and S1, S4, S6 and S8 are turned off, i1 will be "−" and i2 and i3 be "+" such that the movable member 102 can incline at an angle with respect to at least one axis, enabling the photographing module 100 to compensate for an angle of inclination. In addition, the angle of inclination can be adjusted by controlling the current values of i1, i2 and i3.

FIG. 4 is a diagram illustrating the timing sequence of pulses sent to the aforementioned eight electronic switch elements. Pulse width modulation is employed to control the On/Off status and duration of the On/Off period of the aforementioned eight electronic switch elements so that i1, i2 and i3 will all be "+" and the desired effective currents thereof can be obtained.

Figure 8:
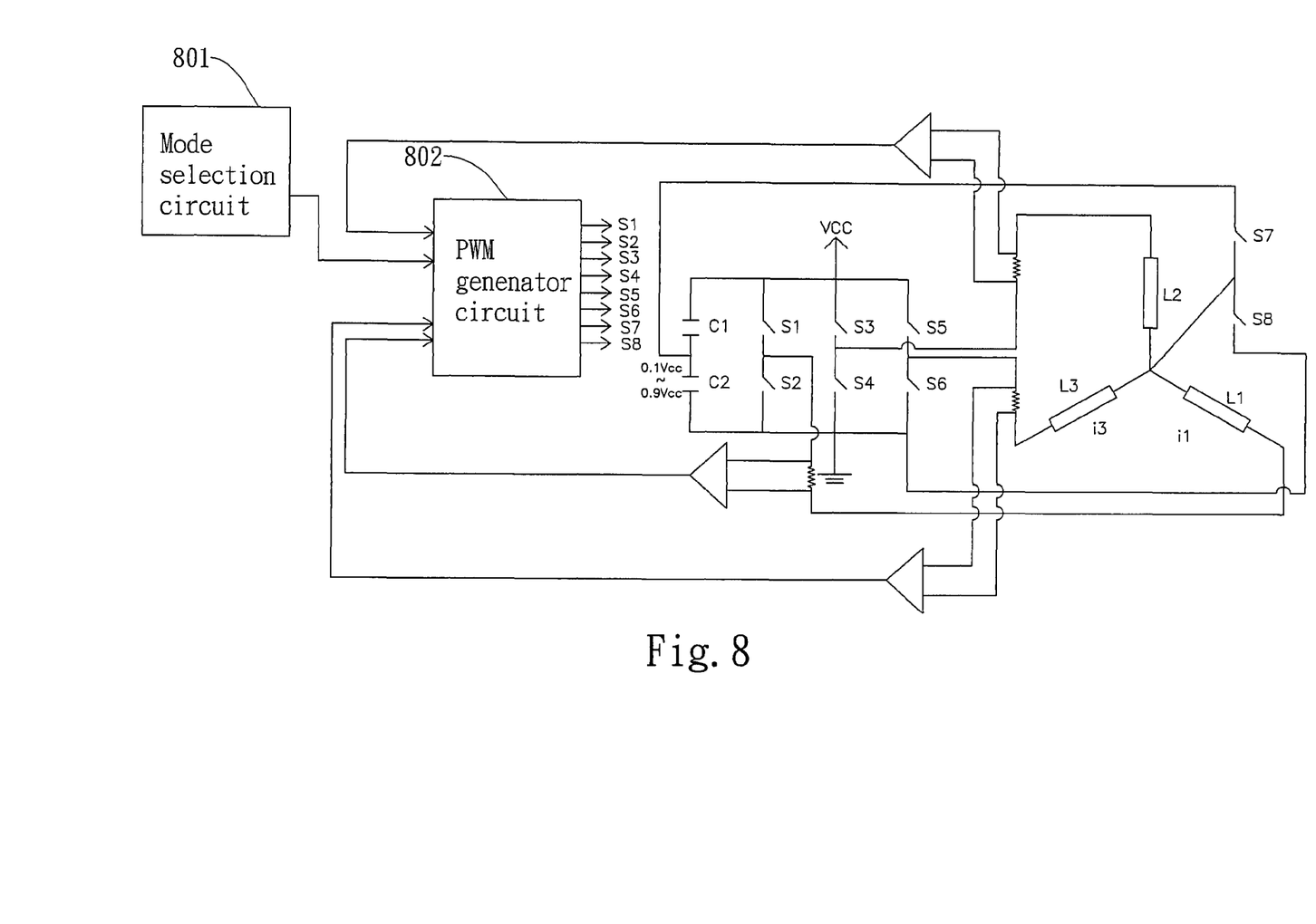
FIG. 8 shows a schematic representation of the present driving circuit employing pulse width modulation.

FIG. 8 is a schematic representation of the present driving circuit employing pulse width modulation. The mode selection circuit 801 selects the direction and magnitude of the axial movement also the direction and size of the angle at which the movable member inclines with respect to at least one axis. The aforementioned electronic switch elements S1-S6 are controlled by the PWM generator (Pulse-Width Modulation) circuit so as to obtain the desired directions and magnitudes of current i1, i2 and i3.

Figure 9A:
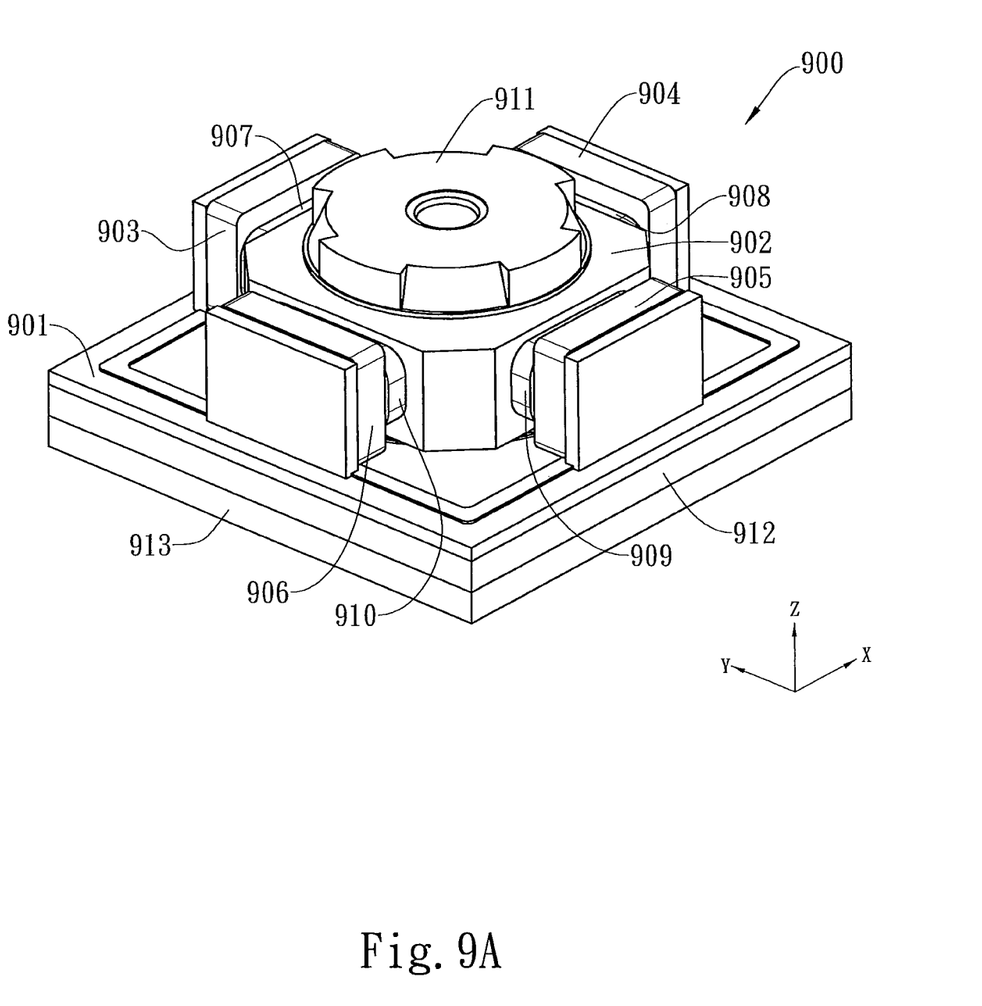
FIG. 9A shows a schematic perspective view of a photographing module which adopts a second embodiment of the present driving circuit.
Figure 9B:
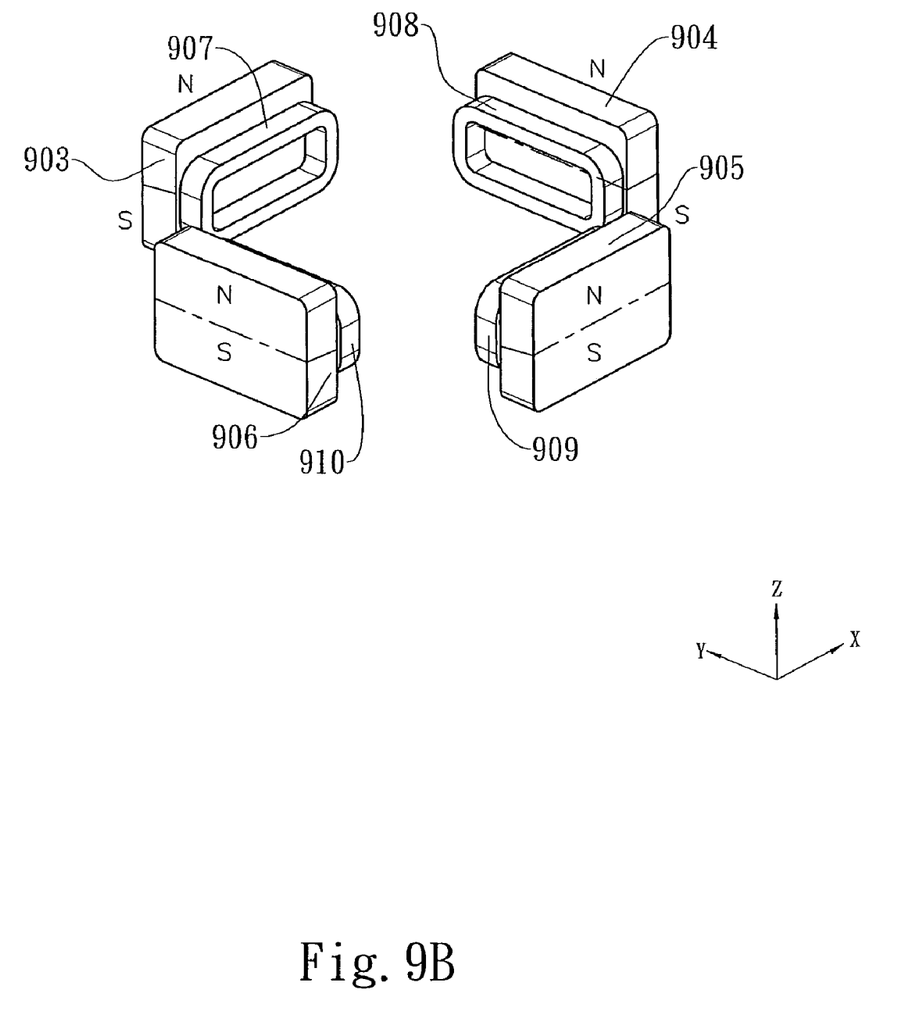
FIG. 9B shows a schematic perspective view of the magnetic circuit system shown in FIG. 9A.

FIG. 9A shows a schematic perspective view of a photographing module 900 which adopts a second embodiment of the present driving circuit. The photographing module 900 includes a holder 901, a movable member 902, a lens assembly 911, and a magnetic circuit system comprising four magnets 903, 904, 905 and 906 and four coils 907, 908, 909 and 910, as shown in FIG. 9B. The magnetic circuit system is evenly and symmetrically disposed around the movable member 902. The magnetic circuit system can at least cause a movement with respect to an axis and enable an angle of inclination with respect to at least one axis. The operation of this magnetic circuit system is the same as that of the magnetic circuit system of the first embodiment.

Figure 10:
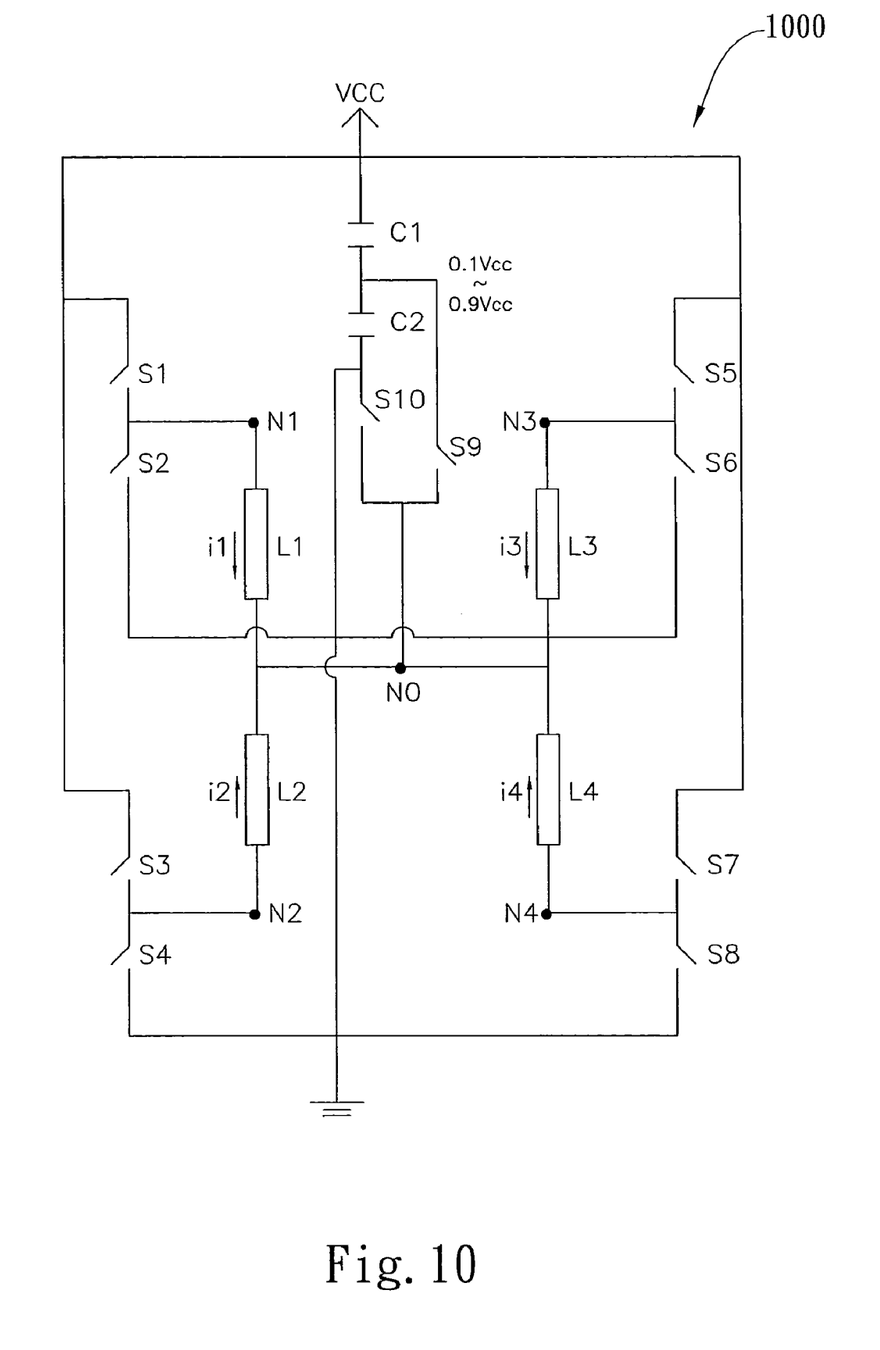
FIG. 10 shows a schematic representation of a driving circuit in accordance with the second embodiment of the present invention.

FIG. 10 shows a schematic representation of a driving circuit 1000 in accordance with the second embodiment of the present invention. The driving circuit 1000 comprises a load comprising four coils L1, L2, L3 and L4 and five signal input ends N0, N1, N2, N3 and N4, a power source VCC configured to drive L1, L2, L3 and L4 and capable of providing an intermediate level (such as 0.9 VCC) between the supply voltage level and the ground level by means of two capacitors C1 and C2, and ten electronic switch elements S1-S10; wherein each of L1, L2, L3 and L4 has a front end and a back end, and the back ends of L1, L2, L3 and L4 are all connected to N0 while the front ends of L1, L2, L3 and L4 are connected to N1, N2, N3 and N4, respectively. In this embodiment, the electric current flowing through L1 from N1 to N0 is defined as i1, the electric current flowing through L2 from N2 to N0 is defined as i2, the electric current flowing through L3 from N3 to N0 is defined as i3, and the electric current flowing through L4 from N4 to N0 is defined as i4. One end of S1, S3, S5 and S7 and one end of C1 are connected to the power source VCC; the other end of S1 is connected to one end of S2 and N1; the other end of S3 is connected to one end of S4 and N2; the other end of S5 is connected to one end of S6 and N3; the other end of S7 is connected to one end of S8 and N4. The other end of each of S2, S4, S6 and S8 and one end of C2 are connected to a grounding end and one end of S10; the other end of S10 is connected to N0 and one end of S9; the other end of S9 is connected to the other end of C1 and the other end of C2. The power source VCC is transmitted by switching the aforementioned electronic switch elements S1-S10 so as to control the magnitudes and directions of the electric currents flowing through L1, L2, L3 and L4, as shown in FIG. 11. FIG. 11 is a table showing the status of the electronic switch elements of the driving circuit in accordance with the second embodiment of the present invention. In the second embodiment, pulse width modulation (PWM) is further employed to control the effective current flowing through each of L1, L2, L3 and L4, thereby the photographing module 900 can perform auto-focusing and compensate for an angle of inclination. The principle adopted here for controlling the directions and magnitudes of the electric currents flowing through L1, L2, L3 and L4 is the same as the one in the first embodiment of the present invention.

The preferred embodiments described above are exemplary and are not intended to limit the claim scope of the present invention. All various modifications and variations made within the spirit of the invention shall be considered as falling within the scope of the appended claims.

What is claimed is:

1. A driving circuit for a photographing module, comprising:
a load comprising at least three coils and at least four signal input ends, wherein one end of each of the coils is commonly connected to one of the signal input ends, and there is one more signal input end than the coils;
a power source for driving the coils and capable of providing an intermediate level between a supply voltage level and a ground level; and
a plurality of electronic switch elements connected to the signal input ends;
wherein the driving circuit controls the magnitudes and directions of the electric currents flowing through the coils by switching the plurality of electronic switch elements, thereby enabling the photographing module to perform auto-focusing and compensate for an angle of inclination.

2. The driving circuit for a photographing module according to claim 1, wherein the power source provides the intermediate level by means of two capacitors.

3. The driving circuit for a photographing module according to claim 1, further controlling an effective current flowing through each of the coils by means of pulse width modulation.

4. The driving circuit for a photographing module according to claim 1, wherein the number of the coils is three, and the number of the signal input ends is four.

5. The driving circuit for a photographing module according to claim 4, wherein the number of the plurality of electronic switch elements is eight.

6. The driving circuit for a photographing module according to claim 1, wherein the number of the plurality of coils is four, and the number of the signal input ends is five.

7. The driving circuit for a photographing module according to claim 6, wherein the number of the plurality of electronic switch elements is ten.

* * * * *